(12) United States Patent
Walker et al.

(10) Patent No.: US 7,707,116 B2
(45) Date of Patent: Apr. 27, 2010

(54) FLEXIBLE LICENSE FILE FEATURE CONTROLS

(75) Inventors: William T. Walker, Evergreen, CO (US); James E. Rhodes, Boulder, CO (US); Robert J. Serkowski, Broomfield, CO (US); Lawrence J. Morgan, Broomfield, CO (US); Mohana Krishnan Gopalakrishna, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 1693 days.

(21) Appl. No.: 10/231,999

(22) Filed: Aug. 30, 2002

(65) Prior Publication Data

US 2004/0054930 A1    Mar. 18, 2004

(51) Int. Cl.
*G06F 17/60* (2006.01)
(52) U.S. Cl. ........................................ 705/59
(58) Field of Classification Search ................. 705/59
See application file for complete search history.

(56) References Cited

U.S. PATENT DOCUMENTS

| | | | |
|---|---|---|---|
| 4,288,659 A | 9/1981 | Atalla | 178/22.08 |
| 4,405,829 A | 9/1983 | Rivest et al. | |
| 4,780,821 A | 10/1988 | Crossley | |
| 4,811,393 A | 3/1989 | Hazard | 380/21 |
| 4,888,800 A | 12/1989 | Marshall et al. | 380/21 |
| 4,937,863 A | 6/1990 | Robert et al. | |
| 5,157,663 A | 10/1992 | Major et al. | |
| 5,179,591 A | 1/1993 | Hardy et al. | 380/21 |
| 5,204,897 A | 4/1993 | Wyman | 380/4 |
| 5,206,903 A | 4/1993 | Kohler et al. | |
| 5,230,020 A | 7/1993 | Hardy et al. | 380/21 |
| 5,260,999 A | 11/1993 | Wyman | |
| 5,307,481 A | 4/1994 | Shimazaki et al. | |
| 5,329,570 A | 7/1994 | Glassmacher et al. | 379/189 |

(Continued)

FOREIGN PATENT DOCUMENTS

EP    1 071 253 A1    1/2001

(Continued)

OTHER PUBLICATIONS

U.S. Appl. No. 09/357,679, filed Jul. 20, 1999, Serkowski.

(Continued)

*Primary Examiner*—Pierre E Elisca
(74) *Attorney, Agent, or Firm*—Sheridan Ross P.C.

(57) ABSTRACT

The present invention is directed to licensing data structures for telecommunication systems. The data structures comprise (a) a lock setting or status to permit the contents of the license file for an operational feature to take precedence over the corresponding translation information for the operational feature or to be used as a default setting if there is not corresponding translation information for the operational feature; (b) first and second value settings for an operational feature to permit a value associated with the operational feature to be set anywhere in the range defined by the first and second value settings; and (c) a right-to-use field for an operational feature that is separate from a setting field for the operational feature to provide flexibility in altering the setting field without deleting the operational feature. The present invention further provides a methodology for providing temporary licenses having different features enabled/disabled than a permanent license.

44 Claims, 7 Drawing Sheets

U.S. PATENT DOCUMENTS

| | | | |
|---|---|---|---|
| 5,341,427 A | 8/1994 | Hardy et al. ............... 380/21 |
| 5,347,580 A | 9/1994 | Molva et al. |
| 5,386,369 A | 1/1995 | Christiano |
| 5,390,297 A | 2/1995 | Barber et al. |
| 5,408,649 A | 4/1995 | Beshears et al. |
| 5,448,639 A | 9/1995 | Arazi |
| 5,553,143 A | 9/1996 | Ross et al. |
| 5,563,946 A | 10/1996 | Cooper et al. |
| 5,671,412 A * | 9/1997 | Christiano ............... 707/104.1 |
| 5,673,315 A | 9/1997 | Wolf |
| 5,699,431 A | 12/1997 | Van Oorschot et al. ........ 380/30 |
| 5,708,709 A | 1/1998 | Rose ........................... 705/59 |
| 5,717,604 A | 2/1998 | Wiggins .................... 709/229 |
| 5,724,428 A | 3/1998 | Rivest |
| 5,742,757 A | 4/1998 | Hamadani et al. |
| 5,745,569 A | 4/1998 | Moskowitz et al. |
| 5,745,576 A | 4/1998 | Abraham et al. ............... 380/25 |
| 5,745,879 A | 4/1998 | Wyman ........................ 705/1 |
| 5,754,761 A | 5/1998 | Willsey |
| 5,758,068 A | 5/1998 | Brandt et al. ................. 726/27 |
| 5,758,069 A * | 5/1998 | Olsen .......................... 726/27 |
| 5,790,074 A | 8/1998 | Rangedahl et al. ..... 342/357.13 |
| 5,790,664 A | 8/1998 | Coley et al. .................... 380/4 |
| 5,828,747 A | 10/1998 | Fisher et al. |
| 5,835,600 A | 11/1998 | Rivest |
| 5,864,620 A | 1/1999 | Pettitt |
| 5,905,793 A | 5/1999 | Flockhart et al. |
| 5,905,860 A | 5/1999 | Olsen et al. ............. 395/187.01 |
| 5,935,243 A | 8/1999 | Hasebe et al. |
| 5,940,504 A | 8/1999 | Griswold ..................... 705/59 |
| 5,960,085 A | 9/1999 | de la Huerga |
| 5,978,565 A | 11/1999 | Ohran et al. |
| 5,982,873 A | 11/1999 | Flockhart et al. |
| 5,995,625 A | 11/1999 | Sudia et al. |
| 6,009,401 A | 12/1999 | Horstmann |
| 6,011,973 A | 1/2000 | Valentine et al. ......... 455/456.6 |
| 6,023,763 A | 2/2000 | Grumstrup et al. |
| 6,023,766 A | 2/2000 | Yamamura |
| 6,047,242 A | 4/2000 | Benson |
| 6,067,621 A | 5/2000 | Yu et al. |
| 6,108,703 A | 8/2000 | Leighton et al. ............ 709/226 |
| 6,128,389 A | 10/2000 | Chan et al. |
| 6,134,660 A | 10/2000 | Boneh et al. |
| 6,148,415 A | 11/2000 | Kobayashi et al. |
| 6,163,607 A | 12/2000 | Bogart et al. |
| 6,173,053 B1 | 1/2001 | Bogart et al. |
| 6,178,511 B1 | 1/2001 | Cohen et al. |
| 6,189,146 B1 | 2/2001 | Misra et al. |
| 6,192,122 B1 | 2/2001 | Flockhart et al. |
| 6,212,635 B1 | 4/2001 | Reardon |
| 6,219,652 B1 | 4/2001 | Carter et al. |
| 6,223,291 B1 | 4/2001 | Puhl et al. |
| 6,246,871 B1 | 6/2001 | Ala-Laurila |
| 6,314,565 B1 | 11/2001 | Kenner et al. |
| 6,360,320 B1 | 3/2002 | Ishiguro et al. |
| 6,463,534 B1 | 10/2002 | Geiger et al. |
| 6,502,079 B1 | 12/2002 | Ball et al. ..................... 705/59 |
| 6,513,117 B2 | 1/2003 | Tarpenning et al. |
| 6,557,105 B1 | 4/2003 | Tardo et al. |
| 6,574,612 B1 | 6/2003 | Baratti et al. |
| 6,584,454 B1 | 6/2003 | Hummel et al. |
| 6,640,305 B2 | 10/2003 | Kocher et al. |
| 6,654,888 B1 | 11/2003 | Cooper et al. |
| 6,675,208 B1 | 1/2004 | Rai et al. |
| 6,697,945 B2 | 2/2004 | Ishiguro et al. |
| 6,760,324 B1 | 7/2004 | Scott et al. |
| 6,765,492 B2 | 7/2004 | Harris ..................... 340/686.6 |
| 6,769,063 B1 | 7/2004 | Kanda et al. |
| 6,775,782 B1 | 8/2004 | Buros et al. |
| 6,778,820 B2 | 8/2004 | Tendler ................... 455/414.2 |
| 6,816,842 B1 | 11/2004 | Singh et al. |
| 6,826,606 B2 | 11/2004 | Freeman et al. ............. 709/223 |
| 6,850,958 B2 | 2/2005 | Wakabayashi |
| 6,854,010 B1 | 2/2005 | Christian et al. |
| 6,868,403 B1 | 3/2005 | Wiser et al. |
| 6,876,984 B2 | 4/2005 | Tadayon et al. |
| 6,883,095 B2 | 4/2005 | Sandhu et al. |
| 6,889,212 B1 | 5/2005 | Wang et al. |
| 6,904,523 B2 | 6/2005 | Bialick et al. |
| 6,920,567 B1 | 7/2005 | Doherty et al. ............... 726/22 |
| 6,928,166 B2 | 8/2005 | Yoshizawa |
| 6,928,558 B1 | 8/2005 | Allahwerdi et al. |
| 6,934,463 B2 | 8/2005 | Ishiguro et al. |
| 6,934,848 B1 | 8/2005 | King et al. |
| 6,957,344 B1 | 10/2005 | Goldshlag et al. |
| 6,961,858 B2 | 11/2005 | Fransdonk |
| 6,973,444 B1 | 12/2005 | Blinn et al. |
| 6,976,164 B1 | 12/2005 | King et al. |
| 6,981,222 B2 | 12/2005 | Rush et al. |
| 7,032,113 B2 | 4/2006 | Pendlebury |
| 7,065,214 B2 | 6/2006 | Ishiguro et al. |
| 7,073,063 B2 | 7/2006 | Peinado |
| 7,085,382 B2 | 8/2006 | Terao et al. |
| 7,100,044 B2 | 8/2006 | Watanabe et al. |
| 7,124,304 B2 | 10/2006 | Bel et al. |
| 7,146,340 B1 | 12/2006 | Musson |
| 7,149,806 B2 | 12/2006 | Perkins et al. |
| 7,152,245 B2 | 12/2006 | Dublish et al. |
| 7,171,662 B1 | 1/2007 | Misra et al. |
| 7,185,195 B2 | 2/2007 | Hug et al. |
| 7,206,936 B2 | 4/2007 | Aull et al. |
| 7,225,333 B2 | 5/2007 | Peinado et al. |
| 7,228,426 B2 | 6/2007 | Sinha et al. |
| 7,302,703 B2 | 11/2007 | Burns |
| 7,308,717 B2 | 12/2007 | Koved et al. |
| 7,313,828 B2 | 12/2007 | Holopainen |
| 7,318,236 B2 | 1/2008 | DeMello et al. |
| 7,356,692 B2 | 4/2008 | Bialick et al. |
| 7,382,881 B2 | 6/2008 | Uusitalo et al. |
| 7,383,205 B1 | 6/2008 | Peinado et al. |
| 7,545,931 B2 | 6/2009 | Dillaway |
| 2001/0001268 A1 | 5/2001 | Menon et al. |
| 2001/0013024 A1 | 8/2001 | Takahashi |
| 2001/0034846 A1 | 10/2001 | Beery |
| 2002/0001302 A1 | 1/2002 | Pickett ....................... 370/352 |
| 2002/0013722 A1 | 1/2002 | Kanaga |
| 2002/0017977 A1 | 2/2002 | Wall ......................... 340/5.28 |
| 2002/0038422 A1 | 3/2002 | Suwamoto et al. |
| 2002/0052939 A1 | 5/2002 | Lee |
| 2002/0083003 A1 | 6/2002 | Halliday ...................... 705/52 |
| 2002/0087892 A1 | 7/2002 | Imazu |
| 2002/0104006 A1* | 8/2002 | Boate et al. .................. 713/186 |
| 2002/0107809 A1 | 8/2002 | Biddle et al. |
| 2002/0112186 A1 | 8/2002 | Ford et al. |
| 2002/0116340 A1 | 8/2002 | Hellberg et al. |
| 2002/0125886 A1 | 9/2002 | Bates et al. .................. 324/307 |
| 2002/0138441 A1 | 9/2002 | Lopatic |
| 2002/0154777 A1 | 10/2002 | Candelore ................... 380/258 |
| 2002/0164025 A1 | 11/2002 | Raiz et al. ................... 380/231 |
| 2002/0174356 A1 | 11/2002 | Padole et al. ................ 713/200 |
| 2002/0176404 A1 | 11/2002 | Girard ........................ 370/352 |
| 2002/0188656 A1 | 12/2002 | Patton et al. |
| 2002/0188704 A1* | 12/2002 | Gold et al. .................. 709/221 |
| 2002/0194473 A1 | 12/2002 | Pope et al. |
| 2003/0005427 A1 | 1/2003 | Herrero ...................... 717/178 |
| 2003/0013411 A1 | 1/2003 | Uchiyama |
| 2003/0023564 A1 | 1/2003 | Padhye et al. |
| 2003/0055749 A1 | 3/2003 | Carmody et al. |
| 2003/0095542 A1 | 5/2003 | Chang et al. |
| 2003/0144959 A1 | 7/2003 | Makita |
| 2003/0149670 A1 | 8/2003 | Cronce |
| 2003/0149874 A1 | 8/2003 | Balfanz et al. |
| 2003/0156719 A1 | 8/2003 | Cronce |
| 2003/0163428 A1 | 8/2003 | Schneck et al. |

| | | |
|---|---|---|
| 2003/0191936 A1 | 10/2003 | Kawatsura et al. |
| 2003/0208449 A1 | 11/2003 | Diao |
| 2003/0233547 A1 | 12/2003 | Gaston et al. |
| 2004/0073517 A1 | 4/2004 | Zunke et al. ............... 705/59 |
| 2004/0078339 A1 | 4/2004 | Goringe et al. ............ 705/59 |
| 2004/0088541 A1 | 5/2004 | Messerges et al. |
| 2004/0103011 A1 | 5/2004 | Hatano et al. |
| 2004/0103324 A1 | 5/2004 | Band |
| 2004/0127196 A1 | 7/2004 | Dabbish et al. |
| 2004/0128395 A1 | 7/2004 | Miyazaki |
| 2004/0128551 A1 | 7/2004 | Walker et al. ............ 713/201 |
| 2004/0133794 A1 | 7/2004 | Kocher et al. |
| 2004/0162998 A1 | 8/2004 | Tuomi et al. |
| 2004/0166878 A1 | 8/2004 | Erskine et al. .......... 455/456.1 |
| 2004/0172367 A1 | 9/2004 | Chavez ..................... 705/59 |
| 2004/0181695 A1 | 9/2004 | Walker ..................... 713/202 |
| 2004/0181696 A1 | 9/2004 | Walker ..................... 713/202 |
| 2004/0199760 A1 | 10/2004 | Mazza ..................... 713/150 |
| 2004/0249763 A1 | 12/2004 | Vardi |
| 2004/0260589 A1 | 12/2004 | Varadarajan et al. |
| 2004/0268120 A1 | 12/2004 | Mirtal et al. |
| 2005/0005098 A1 | 1/2005 | Michaelis et al. |
| 2005/0038753 A1 | 2/2005 | Yen et al. |
| 2005/0076204 A1 | 4/2005 | Thornton et al. |
| 2005/0086174 A1 | 4/2005 | Eng |
| 2005/0144437 A1 | 6/2005 | Ransom et al. |
| 2005/0154877 A1 | 7/2005 | Trench |
| 2005/0185792 A1 | 8/2005 | Tokutani et al. |
| 2005/0198510 A1 | 9/2005 | Robert et al. |
| 2005/0202830 A1 | 9/2005 | Sudit ...................... 455/456.1 |
| 2005/0229004 A1 | 10/2005 | Callaghan |
| 2005/0246098 A1 | 11/2005 | Bergstrom et al. .......... 701/213 |
| 2005/0289072 A1 | 12/2005 | Sabharwal |
| 2006/0021068 A1 | 1/2006 | Xu et al. |
| 2006/0036554 A1 | 2/2006 | Schrock et al. |
| 2006/0036894 A1 | 2/2006 | Bauer et al. |
| 2006/0089912 A1 | 4/2006 | Spagna et al. |
| 2006/0178953 A1 | 8/2006 | Aggarwal et al. |
| 2006/0242083 A1 | 10/2006 | Chavez |
| 2007/0033419 A1 | 2/2007 | Kocher et al. |
| 2007/0107067 A1 | 5/2007 | Fountian |
| 2008/0082449 A1 | 4/2008 | Wilkinson et al. |
| 2008/0141242 A1 | 6/2008 | Shapiro |

FOREIGN PATENT DOCUMENTS

| | | |
|---|---|---|
| EP | 1562378 | 8/2005 |
| JP | 2006085481 A * | 3/2006 |

OTHER PUBLICATIONS

U.S. Appl. No. 10/811,412, filed Mar. 25, 2004, Walker.
U.S. Appl. No. 10/947,418, filed Sep. 21, 2004, Gilman et al.
U.S. Appl. No. 10/775,498, filed Feb. 9, 2004, Gilman et al.
ADTech Engineering, "IP Phone SI-160 User Manual (SCCP releases)," Version 1.2 (2002), pp. 1-20.
Articsoft Limited, "Public Key Infrastructure (PKI) FAQs" (Feb. 2, 2003), available at http://www.articsoft.com/wp_pki_faq.htm, 5 pages.
ARSYS, "Public Key Infrastructure," (Feb. 4, 2001), available at http://www.transactiontrust.com/technicaindex.html. 4 pages.
Clarke, Roger, "Centrelink Smart Card Technical Issues Starter Kit Chapter 7" (Apr. 8, 1998) at http://www.anu.edu.au/people/Roger.Clarke/DV/SCTISK.html, pp. 1-3.
Datakey, "Securing a Virtual Private Network with Smart Card Technology" available at www.datakey.com, pp. 1-8.
"Digital Cinema Key Management Messages," Draft 1 (Aug. 8, 2002), pp. 1-9.
Discerning the Times Digest and Newsbytes, "Global Control of All Buying and Selling Now Possible,"Vol. 1, Iss. 1 (Jan. 2000), available at http://www.discerningtoday.org/members/Digest/2000Digest/January/Global%20Control.htm, 2 pages.
Info Merchant Store, "VeriFone 2000, MS/DUKPT/STD Pin Pad, New" (printed Feb. 17, 2007), available at http://www.merchantamerica.com/creditcardterminals/index.php?ba=product_enlarge&product=9632, 1 page.
Griswold, Robert S., "Get Smart: The Coming Revolution of Smart Cards," *Journal of Property Management* (May/Jun. 1997), 5 pages.
Entrust Inc., "Entrust Authority Security Manager," (printed Aug. 13, 2004), available at http://www.entrust.com/authority/manager/index.htm, 23 pages.
Infosec Engineering, "Building a Corporate Public Key Infrastructure" (1999), available at http://www.infoseceng.com/corppki.htm, 20 pages.
LockStream Corporation, "Catalyst DRM Service Platform Architecture," Vers. 1.0 (Nov. 2003), pp. 1-28.
LockStream Corporation, "Catalyst DRM Service Platform" (printed Aug. 13, 2004), available at http://www.lockstream.com/products_spcm.php, 1 page.
LockStream Corporation, "Lockstream KeyDRM" (printed Aug. 13, 2004), available at http://www.lockstream.com/products_1gm.php, 2 pages.
LockStream Corporation, "Lockstream OMA 1.0 DRM Client" (printed Aug. 13, 2004), available at http://www.lockstream.com/products_sprm.php, 2 pages.
Microsoft Corporation, "Accessing a Smart Card" (Aug. 2002), available at http://msdn.microsoft.com/library/en-us/security/security/accessing_a_smart_card.asp, p. 1.
Microsoft Corporation, "Base Service Providers" (Aug. 2002), available at http://msdn.microsoft.com/library/en-us/security/security/base_service_providers.asp, p. 1.
Microsoft Corporation, "Building an ISO7816-4 APDU Command" (Aug. 2002), available at http://msdn.microsoft.com/library/en-us/security/security/building_an_iso7816_4_apdu_command.asp, pp. 1-2.
Microsoft Corporation, "Introducing Smart Cards to the System" (Aug. 2002), available at http://msdn.microsoft.com/library/en-us/security/security/introducing_smart_cards_to_the_system.asp, p. 1.
Microsoft Corporation, "Primary Service Provider" (Aug. 2002), available at http://msdn.microsoft.com/library/en-us/security/security/primary_service_provider.asp, p. 1.
Microsoft Corporation, "Smart Card Authentication" (Aug. 2002), available at http://msdn.microsoft.com/library/en-us/security/security/smart_card_authentication.asp, pp. 1-2.
Microsoft Corporation, "Smart Card Interfaces" (Aug. 2002), available at http://msdn.microsoft.com/library/en-us/security/security/smart_card_interfaces.asp, p. 1.
Microsoft Corporation, "Smart Card Resource Manager" (Aug. 2002), available at http://msdn.microsoft.com/library/en-us/security/security/smart_card_resource_manager.asp, p. 1.
Microsoft Corporation, "Smart Card User Interface" (Aug. 2002), available at http://msdn.microsoft.com/library/en-us/security/security/smart_card_user_interface.asp, p. 1.
Microsoft Corporation, "Smart Card Service Providers" (Aug. 2002), available at http://msdn.microsoft.com/library/en-us/security/security/smart_card_service_providers.asp, p. 1.
Microsoft Corporation, "Vendor Wrapper Service Provider" (Aug. 2002), available at http://msdn.microsoft.com/library/en-us/security/security/vendor_wrapper_service_provider.asp, pp. 1-2.
MIT Laboratory for Computer Science, "The Cricket Indoor Location System,"An NMS Project (printed Jul. 31, 2002, available at http://nms.lcs.mit.edu/projects/cricket/, 5 pages.
Motorola Press Release, "ERG Motorola Alliance Receives Award for Smart Card" (Jun. 6, 2000), available at http://www.motorola.com/LMPS/pressreleases/page888.htm, 3 pages.
NEC Infrontia Corporation Press Release, "Establishment of "SmartCardInfrontia" solutions for 'IC card'," (Mar. 13, 2002), 4 pages.
Novell © "Certificate Server: Public Key Instrastructure." White Paper (1999). pp. 1-10.
SecurityConfig, Back Up Your Encrypting File System Private Key in Windows 2000 Download (Printed Aug. 13, 2004), available at http://www.securityconfig.com/software/alerts/back_up_your_encrypting_file_system_private_key_in_windows_2000.html, 2 pages.

Smart Card Alliance Industry News, "Cubic Introduces New Mobile Ticketing Machine" (Jul. 3, 2003), available at http://www.smartcardalliance.org/industry_news/industry$_{13}$ news_item.cfm?itemID=852, 2 pages.

Smart Card Alliance Industry News, "Cubic Corp. Introduces New National Security and Homeland Defense" (Sept. 9, 2002), available at http://www.smartcardalliance.org/industry_news/industry_news_item.cfm?itemID=310, 2 pages.

SSH Communications Security Corp., "Enabling Virtual Public Networks with Public Key Infrastructure," White Paper (Jan. 2004), pp. 1-9.

Streetman, Kibbee D. et al., "Public Key Infrastructure: Resources, Requirements and Recommendations," ATI IPT Special Report 00-06 (Apr. 2000), pp. 1-45.

Sun Developer Network, "Smart Card Overview," Sun Microsystems, Inc. (1994-2004), available at http://java.sun.com/products/javacard/smartcards.html, 2 pages.

NetLingo Dictionary of Internet Words, "Smart Card"(1995-0004), available at http://www.netlingo.com/lookup.cfm?term=smart+card, 2 pages.

Rankl, Wolfgang, "Smart Card Handbook," (Jun. 13, 2004), available at http://www.wrankl.de/SCH/SCH.html, 8 pages.

Russinovich, Mark, "Inside Encrypting File System, Part 1," *Windows & .NET Magazine* (Jun. 1999), available at http://www.winntmag.com/Articles/Index.cfm?ArticleID=5387&Key=Internals, 4 pages.

Russinovich, Mark, "Inside Encrypting File System, Part 2," *Windows & .Net Magazine* (Jul. 1999), available at http://www.winntmag.com/Articles/Index.cfm?ArticleID=5592&Key=Internals, 5 pages.

VeriFone Inc., "VeriFone Payment Solutions: Point-of-Sale PINpads" (1997-2004), available at http://www.verifone.com/products/printers_peripherals/html/pinpad_family.html, 1 page.

Whatis.com Target Search™, "PKI" (Jan. 13, 2004), available at http://whatis techtarget.com/definition/0,289893,sid9_gci214299,00_,html, 4 pages.

U.S. Appl. No. 10/231,957, filed Aug. 30, 2002, Serkowski et al.
U.S. Appl. No. 10/232,507, filed Aug. 30, 2002, Serkowski et al.
U.S. Appl. No. 10/232,508, filed Aug. 30, 2002, Rhodes et al.
U.S. Appl. No. 10/232,906, filed Aug. 30, 2002, Walker et al.
U.S. Appl. No. 10/232,647, filed Aug. 30, 2002, Walker et al.
U.S. Appl. No. 10/956,861, Robinson.
U.S. Appl. No. 11/051,316, Mazza.

FLEXlm End Users Guide, Version 9.2. Jul. 2003. Published by Macrovision. 166 pages.

A. Menezes, P. van Oorschot and S. Vanstone, Handbook of Applied Cryptography, cr8523_01[1].pdf, Chapter 1, 48 pages.

A. Menezes, P. van Oorschot and S. Vanstone, Handbook of Applied Cryptography, cr8523_1 0[1 ].pdf, Chapter 10, 40 pages.

A. Menezes, P. van Oorschot and S. Vanstone, Handbook of Applied Cryptography, cr8523_12[1].pdf, Chapter 12, 53 pages.

Java Skyline: Java Servlet/Server Headline News, Oct. through Dec. 1998, pp. 1-3.

Sun Microsystems, Inc. Java Cryptography Architecture API Specification & Reference, Aug. 4, 2002, 56 pages.

MATLAB Installation Guide for PC, Release 11, The MathWorks Inc, 1999.

Microsoft Systems Management Server 2.0 Resource Guide, Microsoft Press, 1999. ISBN 0-7356-0583-1.

Windows NT Server 4. Garms, Jason. SAMS Publishing, 1998. ISBN 0-672-31249-2.

Bowman, Louise, Smart Cards Go Corporate (Andrew Phillips from Dataquest forecasts the number of smart cards corporations will buy to increase to 91.9 mil by 2004 from a total of 230,000 in 2000), Oct. 2000, Thomson Media, Oct. 2000, pp. 1-6.

Kuchinskas, Susan, Keeping content safe is a big job and everyone has to do it: the security of its corporate content can make or break Topps. (Topps employs security consultant to watch network traffic), Jul. 2003, 2003 Online, Inc., Jul. 2003, pp. 1-5.

Multos Fights on, Jan. 2004, Thomson Media, Inc., Jan. 2004, pp. 1-7.

* cited by examiner

| LICENSE CONTENT | | TYPE I FEATURE STATUS | ADMINISTRABLE BY LOGIN? |
| --- | --- | --- | --- |
| VALUE | LOCK | | |
| On | Unlocked | Set by translation via login. If no translation, feature is enabled. | Yes |
| On | Locked | Translation is ignored. Feature is enabled any time translations are loaded. | Yes, but on next license check will return to license setting. |
| Off | Unlocked | Set by translation via login. If no translation, feature is disabled. | Yes |
| Off | Locked | Translation is ignored. Feature is disabled any time translations are loaded and cannot be turned on by any login. | No |

*FIG. 2*

| LICENSE CONTENT | TYPE II AND TYPE III FEATURE STATUS | ADMINISTRABLE BY LOGIN? |
| --- | --- | --- |
| V1 AND V2 | | |
| V1 < V2 | If no translations are present or if translation value is less than V1 or greater than V2, feature has value V1. If translations are present and have a value from V1 to V2, then feature has value from translation. | Yes, any value from V1 to V2. |
| V1 = V2 | Feature has value V1. | No |
| V1 > V2 | Thi is invalid state. The license tool prohibits this condition. License is invalid. | N/A |

*FIG. 3*

System ID —700
Sold-to Customer Information —704
Distributor information —708
Dealer Information —712
End Customer Information —716
Authorized User Access Information —720
License Generation Information —724
        Platform Type —728
        Serial Number —732
        PID —736
        Application Name —740
        Software Version —744
        Expiration Date —748
Type I Feature information —752
        Type I ON/OFF Feature Settings - Right to Use —756
        Type I ON/OFF Feature Settings - Features Activated —760
Type II Features Information —764
        Type II Value Feature Right to Use —768
        Type II Value Feature Range —772
        Type II Value Feature Setting —776
Type III Feature Information —780
        Type III Registration Feature Right to Use —784
        Type III Registration Feature Release —788
        Type III Registration Feature Range —792
        Type III Registration Feature Setting —796
License Delivery Information —797
Module Information —798
Application Information —799
System Record History —789

*FIG. 7*

FLEXIBLE LICENSE FILE FEATURE CONTROLS

FIELD OF THE INVENTION

The present invention relates generally to the licensing of computational components and specifically to the licensing of computational components in telecommunication systems.

BACKGROUND OF THE INVENTION

To protect software manufacturers' copyrights in software sold to the public, manufacturer's commonly license software to the purchaser. Additionally, in many applications the purchaser has elected to pay only for certain features of software which must be selectively enabled by the manufacturer. In particular, each release or version of a particular software package for a customer premise telecommunication switching system contains a large number of features, and most customers elect to pay for only a subset of the total number of features. Features in a telecommunications switching system refer to certain specialized operations such as call hold, call transfer, automatic route selection, etc. An ongoing problem in the art is to prevent newer versions of software from being pirated and used on unauthorized hardware and/or otherwise authorized customers from actuating features for which the customer has not paid.

A number of methods have been developed to protect against such unauthorized use of software.

In one method, passwords, that allow only authorized individuals to have access to the telecommunication switching system, are used to control enablement of features or new software versions. This method is inflexible and inconvenient for customers as an authorized technician must be scheduled to enable the features, can be circumvented by a person misappropriating or misusing the password, and does not provide for periodic license verification during system operation.

In another method, a key is required to enable the software program. This solution does not solve the copying problem because the key is normally printed on the packaging of the software, and anyone can install the software as many times as they wish, however illegal it may be.

In yet another method, a special piece of hardware or "dongle" is used. The dongle is a special piece of hardware that connects to the serial or parallel port of the computer. The software running on the computer sends a random number to the dongle. The dongle performs a secret computation and returns a result. The software makes a like computation; if the two computations match, the software continues to run. To work satisfactorily, the response must include feature and version information. The use of the dongle is cumbersome when it fails. In the event that the dongle fails, the system is down until a new dongle can be physically obtained on site. Also, once made the dongle is fixed. If it was used for feature activation, a new dongle is required for each additional feature that is purchased.

A further method is to freely distribute CD-ROM disks. When the CD-ROM is inserted into a computer, the computer automatically connects to a remote server via the Internet or a dial-up connection to receive a machine-specific key. The key unlocks the software so that it can be utilized on that computer. The remote server also obtains the necessary payment information from the computer user. This method does not function well for a telecommunication switching system since it does not provide for the authorization to use different features of the same software application nor is it dependent on the version of the software being requested. In addition, it does not provide the necessary authorization of personnel to make such a request.

Another method requires the software, upon installation or first execution, to record serial number information (e.g., medium access control or MAC address) regarding predetermined hardware components of the computer system. The software permits the user a specified number of hardware serial number changes before it disables itself. This method, though effective, is unfair to users who, over time, legitimately exceed the number of permitted serial number changes through reuse of the software on a number of different systems and/or periodic replacement of some of the predetermined hardware components in a given system to upgrade or maintain the system.

The drawbacks of the various licensing methods discussed above are addressed by the licensing method discussed in detail in copending U.S. patent application entitled "Securing Feature Activation in a Telecommunication System", Ser. No. 09/357,679, filed Jul. 20, 1999, to Serkowski, which is incorporated herein by this reference. In this method, a valid license file is required to run a computational component. The license file contains a serial number that must be present on the hardware that is to execute the licensed software for the license to be valid and the software to be executable. In telecommunication applications, for example, the serial number of the control processor must be in the license file for the control processor to run the licensed software.

The license file also contains a name and/or version of the licensed telecommunication application and licensed features. The data structures corresponding to the features are of two types. In a type 1 feature, the data structures reflected enablement or disablement of the corresponding feature using a simple on/off state. When a feature is assigned the "on" state in the license file, the feature is set to "on" in the system regardless of current settings and cannot be turned off. When a feature is assigned the "off" state in the license file, the feature is set to "off" in the system regardless of current settings and cannot be turned on. In a type 1 feature, the data structures reflected enablement or disablement of the corresponding feature using a simple on/off state. Examples of features falling into this category include abbreviated dialing enhanced list, audible message waiting, vectoring, answer supervision by call classifier, ATM trunking, agent states, dial by name, DCS call coverage, echo cancellation, multifrequency signaling, and wideband switching. In a type 2 feature, the data structures include a single numeric value and/or a name kind of entry for defining feature and capacity settings for various telecommunication applications. Examples of features falling into this category include logged-in agents, offer category, maximum numbers of concurrently registered IP stations, administered IP trunks, ports, and concurrently administered remote office stations/trunks, and call center release.

The licensing method described in the above patent application file can have drawbacks in certain applications. In one example, it is desirable to have more flexible feature controls, particularly for troubleshooting, development work, and certain customer scenarios. Examples of cases where more flexible license feature and capacity controls are needed include turning a feature on based on the license file setting only when the feature has no current setting on the switch and permitting a capacity setting in the license file to use more than one value. In another example, it is desirable to permit a user, whether a customer or service personnel, to log in and change the settings of features from off to on and vice versa and to alter capacity settings without suffering the inconvenience of placing an entirely new order or compromising entitlement to a feature or capacity level. When a customer has paid for and is entitled to a feature or capacity, the customer needs the ability to enable and disable the feature and alter the capacity settings at its convenience. When service personnel are troubleshooting a system, they often wish to turn features (whether paid for by the customer or not) on or off or to increase capacity beyond entitlement levels to assess the source and/or solution to the problem. This needs to be done without losing track of customer entitlements.

SUMMARY OF THE INVENTION

These and other needs are addressed by the various embodiments and configurations of the present invention. The present invention is directed generally to data structures for computational component licensing and/or to temporary license files having different licensing information than permanent license files for the computational component. The computational component can be hardware, software, and/or an operational feature thereof. As used herein, a "feature" or "operational feature" refers to an operational aspect of a computational component.

In a first embodiment of the present invention, a data record (e.g., a system or transaction record, a license file, etc.) for licensing a computational component is provided. The computational component has configuration information (e.g., switch or server translation information) different from the data record. The data structures in the data record include:

(a) a first identifier (e.g., a feature keyword) for a first operational feature;
(b) a mode setting for the first operational feature; and
(c) a lock setting or status for the first operational feature. When the lock setting has a first value, the mode setting in the data record takes precedence over the configuration information on the licensed system and, when the lock setting has a second value different from the first value, the mode setting from the configuration currently present on the system takes precedence over the mode setting in the license file. If no mode setting is present in the system configuration, then the mode setting from the license file is used. An example of a feature associated with the data structure is a Type I feature.

The mode setting can be any variable used for setting or configuring an operation of the computational component. In telecommunication applications, the mode setting is typically configured as "on" to enable a feature and "off" to disable the feature.

The lock setting can be any variable used to control the use of the mode setting. In telecommunication applications, the lock setting is used to define the relative priorities of the mode setting in the license file relative to a mode setting for the same feature in the configuration or translation information. In one configuration, the lock setting can have a lock setting as the first value and an unlock setting as the second value.

In a second embodiment, the data record includes:
(a) a first identifier for the first operational feature and
(b) first and second value settings for the first operational feature.

The first and second value settings can define a range of values for setting a numerical value associated with the first operational feature. For example, the first and second value settings can define a range of port values any of which can be used as the setting for the first operational feature. An example of a feature associated with the data structure is a Type II feature.

In a third embodiment, the data record includes:
(a) a right-to-use indicator associated with the first operational feature and
(b) at least one of a mode and value setting for the first operational feature.

In one configuration, the right-to-use indicator is configured as a listing or array of feature keywords in a right-to-use field. If a feature keyword is not included in the listing or array, there is no right to use the corresponding feature.

In yet another embodiment, a method for licensing a computational component is provided. The method includes the steps of:

(a) providing a system record comprising first licensing information associated with a first set of operational features of the computational component;
(b) receiving second licensing information associated with the first set of operational features, the first and second licensing information being different;
(c) generating a temporary license file containing the second licensing information but not the first licensing information; and
(d) maintaining the first licensing information in the system record.

The methodology is particularly useful for servicing of the computational component. The permanent license file can be replaced with one or more temporary license files (or troubleshooting license files) to diagnose problem(s) with the computational component.

To avoid bypassing of licensing controls, the first licensing information in the system record is not replaced with the second licensing information in the temporary license file. In this manner, when the next license file is generated from the system record the license file will not include the additional (unpaid for) features enabled by the temporary license file. In one configuration, a record of the troubleshooting licenses generated, including the identities of the systems for which the licenses were generated, the additional features that were activated, and the identity of the activating user, are maintained. Such records are used to keep accurate configuration information for the system and also detect fraudulent use of the troubleshooting license file function.

The various embodiments of the present invention can have a number of advantages. First, the embodiments can provide flexible feature controls, particularly for troubleshooting, development work, and certain customer scenarios. For example, the use of "lock" and "unlock" and value ranges permit a feature to be turned on based on the license file setting only when the feature has no current setting in the switch translation file and permit a capacity setting in the license file to use more than one value provided that the value is contained within the predetermined range. Second, these features can permit a user, whether a customer or service personnel, to log in and change the settings of features from off to on and vice versa and to alter capacity settings without suffering the inconvenience of placing an entirely new order or compromising entitlement to a feature or capacity level, without losing track of entitlements. The substantial increase in customer convenience from these abilities can provide high levels of customer satisfaction and higher sales while lowering demands on service personnel. Third, the translation and/or license files can be changed from any location and not just from a central site. For example, the license file can be obtained on a laptop PC from a Web site, the PC carried to the switch, and the new license installed. The license can be installed remotely where switch contact is possible.

These and other advantages will be apparent from the disclosure of the invention(s) contained herein.

The present application is related to U.S. patent application Ser. No. 10/232,906, entitled "REMOTE FEATURE ACTIVATION FEATURE EXTRACTION" to Walker et al.; Ser. No. 10/232,508, entitled "LICENSE MODES IN CALL PROCESSING" to Rhodes et al.; Ser. No. 10/232,507, entitled "LICENSE FILE SERIAL NUMBER TRACKING" to Serkowski et al.; Ser. No. 10/231,957, entitled "LICENSING DUPLICATED SYSTEMS" to Serkowski et al.; and Ser. No. 10/232,647, entitled "SOFTWARE LICENSING FOR SPARE PROCESSORS" to Walker et al., each of which is filed concurrently herewith and is incorporated herein by reference.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 2 is a table showing various settings and statuses for Type I features;

FIG. 3 is a table showing various capacity settings and statuses for Type II and III features;

FIG. 7 depicts the data structures for a system record.

DETAILED DESCRIPTION

Figure 1:
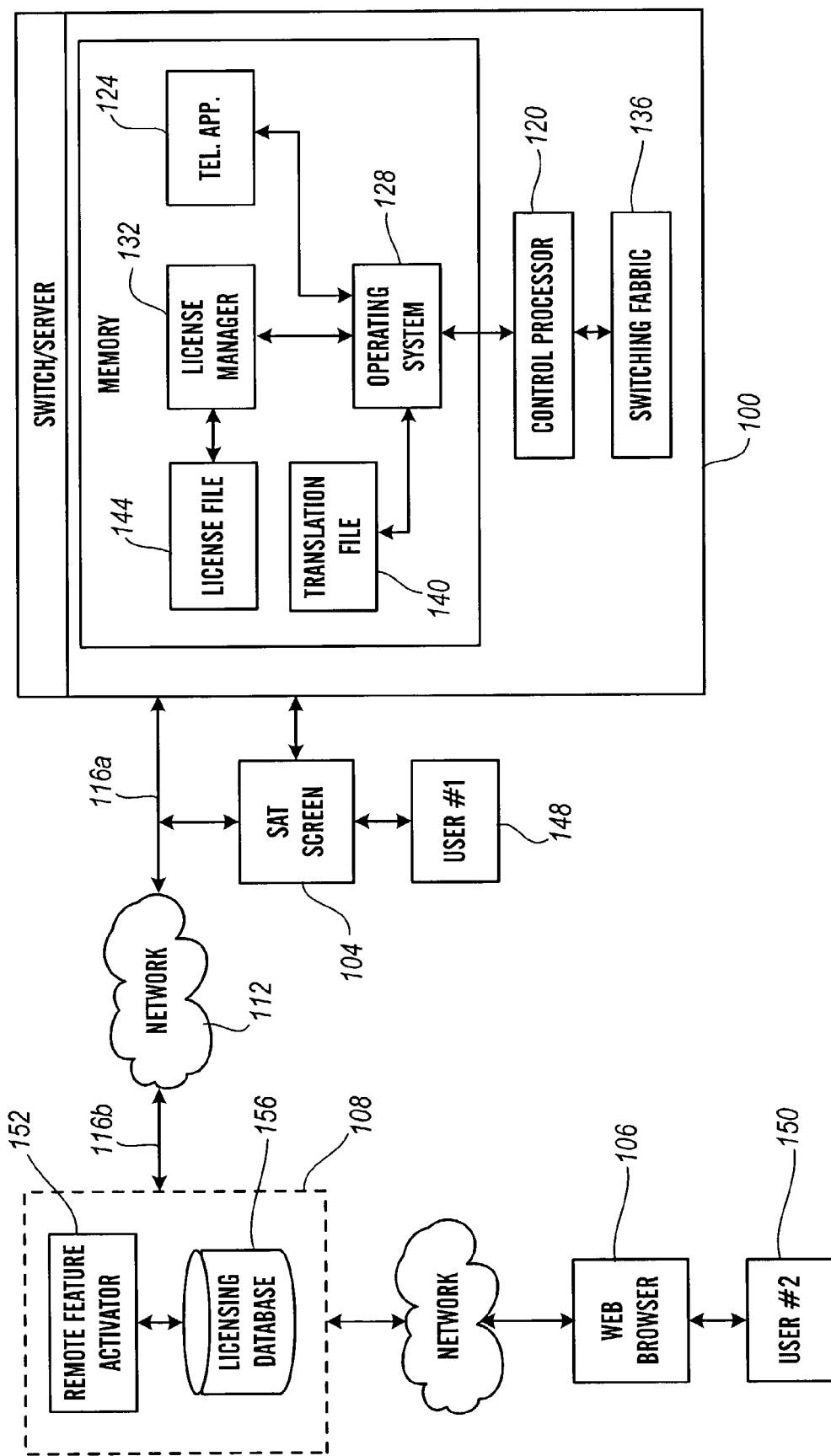
FIG. 1 is a block diagram of a licensing system according to a first embodiment of the present invention.

FIG. 1 depicts a telecommunications licensing architecture according to a first embodiment of the present invention. The architecture comprises a telecommunications switch/server 100, web browser (or graphical user interface ("GUI")) 106, graphical user interface or GUI 104 configured as a Switch Access Terminal or SAT, and a remote feature activation system 108.

Telecommunications switch/server 100 is interconnected to public telephone network 112 via communication links 116a,b. Telecommunications switch/server 100 can comprise communication devices (not shown) such as telephone sets. The features and operations provided by telecommunication switching system 100 to communication devices and its interactions with public telephone network 112 are well known in the art. Illustratively, the switching system of FIG. 1 can be the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference, or Avaya Inc.'s DEFINITY™ private-branch exchange (PBX)-based ACD system.

Control processor 120 executes telecommunication application 124 via operating system 128 to perform the telecommunication functions and features. Control processor 120 executes instructions in memory, such as license manager 132 and telecommunication application 124, and communicates with switching fabric 136.

Operating system 128 is a conventional operating system allowing for the execution of applications such as telecommunication application 124 and for the intra-application communication of messages. Telecommunication application can be any application(s) and/or feature(s) used in telecommunication systems, such as the DEFINITY™ by Avaya, Inc. and the INTUITY AUDIX voice messaging system by Avaya, Inc.

Translation file 140 comprises configuration information regarding the configuration of the switch/server 100 that exists apart from the license file 144 information. The configuration information can comprise, for example, feature setting/status information, capacity settings, and platform type and ID. The translation file 140 can be created and edited by service personnel and/or by customer personnel using the graphical user interface or GUI 104. In a typical application, GUI 104 is interface software running on a personnel computer. GUI 104 is normally the SAT or Switch Access Terminal.

Switching (or server) fabric 136 provides all of the necessary telecommunication switching and interfacing that is required in telecommunication switching system 100.

License manager 132 periodically verifies that the telecommunication switching system 100 is being operated in accordance with pertinent licensing rules and disables the system 100 or an operational part of the system 100 when licensing rules are violated (or a predetermined licensing event occurs). During initialization of the switch software, during the restoration of translations, and periodically as the switch is running, a query is made by the telecommunication application 124 to the license manager 132. The license manager 132 reads license file 144, compares the serial number(s) in the license file 144 with a serial number in the switch hardware, compares the software name and/or version in the license with the name and/or version of the telecommunication application 124 or operational part thereof, and, if a match occurs, delivers permission to run the telecommunication application 124 or operational part thereof with the feature mask in the license file. The feature mask controls revenue associated options.

Figure 6:
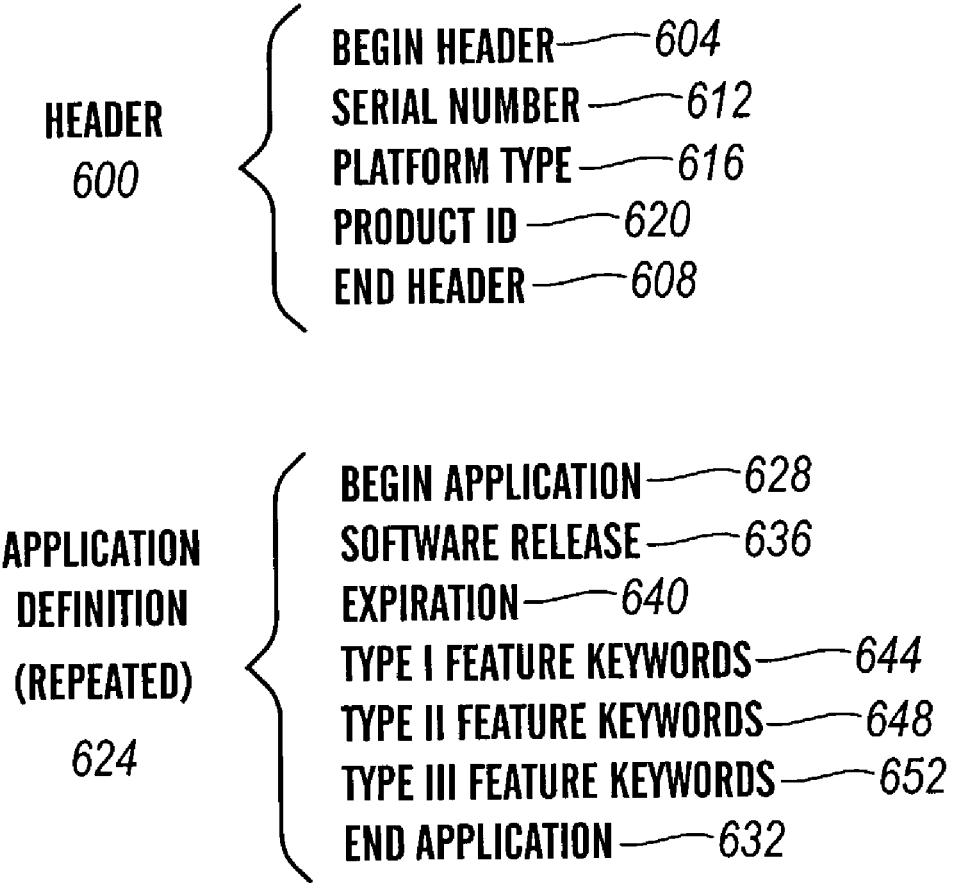
FIG. 6 depicts the data structures for a license file.

Referring to FIG. 6, the license file 144 includes a file header 600 which includes header beginning and ending fields 604 and 608 respectively, serial number field 612 (containing the serial number(s) of control and duplicated control processors), a platform type field 616 (containing first platform information such as the product type and name and/or version of product that the license is for), and a platform identifier or PID field 620 (containing second platform information different from the first platform information such as a product identifier used at the platform level for accessing Access Security Gateway (ASG) keys) and one or more application definitions 624 each of which includes application beginning (which names the application) and ending fields 628 and 632, respectively, a software name and/or release field 636 (identifying software release version for which the license is granted), an expiration field 640 (expiration date of the license), and a Type I, II, and III feature fields 644, 648 and 652 (providing information relating to the features to be enabled). The software application name is defined in the "Begin Application" field 628.

In one configuration, the feature field is configured as a feature mask, though any data format can be used. This configuration is discussed in detail in copending U.S. patent application Ser. No. 10/231,957, entitled "Licensing Duplicated Systems" to Serkowski et al., filed concurrently herewith and incorporated herein by this reference. The content of the mask controls what features are enabled or may be enabled on the product when the switch/server is initialized. As will be appreciated, at switch/server initialization the switch/server reads the translation and license files 140 and 144 and compares the contents of the two files to determine what features to enable and disable and what feature settings to configure.

There are three types of entries corresponding to fields 644, 648, and 652 in the feature mask.

The first type of entry in field 644 relates to a Type I feature or those types of features that have a simple on/off state. The feature is either enabled or disabled. Each of these types of entries has two variables associated with it, namely a value and a lock. The value variable can be either on or off and the lock variable either locked or unlocked. Examples of features falling into this category include (in addition to the Type I features identified above in the background) Digital Communication System or DCS call coverage, audible message waiting, vectoring, attendant vectoring, Asynchronous Transfer Mode or ATM WAN spare processor, ATM, dial by name, echo cancellation, multimedia call handling, multiple call handling, caller identification, multifrequency signaling, Integrated Services Digital Network or ISDN network call redirection, centralized attendant, remote office, enhanced Direct Inward Dialing or DID routing, survivable remote processor, time of day routing, tenant partitioning, hospitality announcements, Vector Directory Number or VDN of origin announcement, wideband switching, and wireless.

As shown by FIG. 2, the various combinations in the license file 144 of "on" and "off" on the one hand and "locked" and "unlocked" on the other produce different outcomes. When the mode setting value is set to "on" and the lock setting value to "unlocked", the feature status or setting is set by the translation file 140 of the switch/server or by user 148 via GUI 104. If there is no feature status or setting in the translation file 140, the feature status to set to "on". When the mode setting value is set to "on" and lock setting value to "locked", the feature status or setting in the translation file 140 is ignored. The feature status or setting is enabled any time the translation is loaded. High level logins can turn the "On Locked" feature off and on in memory only. When the next periodic license check occurs, the feature setting is returned to "on" in accordance with the "On Locked" setting in the license file. The ability to temporarily turn on an "On Locked" feature "off" is provided to support troubleshooting. There is no corresponding ability to turn an "Off Locked" feature on even temporarily. When the mode setting value is set to "off" and the lock setting value to "unlocked", the feature status or setting is set by the translation file 140. If there is no feature status or setting in the translation file 140, the feature status is set to "off". Finally, when the mode setting value is set to "off" and the lock setting value to "locked", the feature status or setting in the translation file 140 is ignored. The feature is disabled at all times. The feature may not be turned on by any log in or by loading the translation file 140.

The second type of entry in field 648 relates to a Type II feature or those types of features that have a numeric value. The value can correspond to a numeric value and/or name kind of entry. Each of these types of entries has two values associated with it, namely a lower limit value V1 and an upper limit value V2. The lower limit value is never greater than the upper limit value. Both values must be set for each feature. Examples of features falling into this category include (in addition to the Type II features identified above in the background) logged-in automated call distribution or ACD agents, maximum currently registered IP stations, maximum administered IP trunks, offer category, maximum number of ports, maximum number of administered remote office trunks, and maximum number of mobile stations.

The third type of entry in field 652 relates to a Type III feature or those types of features that have a product value (e.g., corresponding to a product name or type), a release number (e.g., referring to a product release identifier), and numeric value(s) (e.g., indicating an operational parameter associated with the product and/or release, such as how many ports are licensed, how many licenses for the product are granted, how many concurrent users are allowed, and/or how many stations can be concurrently administered with the feature). This type of feature allows other applications to be executed. It is particularly useful where features that are not currently in use are later implemented. Such features can be accounted for using the Type III feature format. Like the second type of entry, each of these types of entries has two values associated with it, namely a lower limit value and an upper limit value. The lower limit value is never greater than the upper limit value, and both values must be set. The product ID and release fields are set as specified in the license file. They are saved in the translation file 140. They cannot be set using the value saved in the translation file or by a log in. They are display only.

As shown by FIG. 3, the various combinations of V1 and V2 for Type II and III features can produce both valid and invalid states. When value setting V1 is less than value setting V2 in the license file, the feature has the value V1 when no value is assigned to the value setting in the translation file 140 or when the translation file has a value setting that is less than value setting V1 or greater than value setting V2. When a value setting is present in the translation file 140 and the value setting is within the range V1 to V2 inclusive, the feature capacity setting is set as the value in the translation file 140. The value setting in the translation file can be changed within the range of V1 and V2, even when the current value is outside the range. When V1 is equal to V2 in the license file, the feature capacity setting is set equal to V1 and V2 regardless of the value in the translation file 140. The values cannot be changed by a user 148 apart from the generation of a new license file. When V1 is greater than V2 in the license file, the license file is invalid as this is an invalid state. In that event, the feature is given the value of zero and the line on the options form is display only.

For a Type II or III capacity feature that has a corresponding Type I feature that enables/disables the overall feature capability, the feature limit for that feature shall only be applied if the corresponding Type I feature is on. If the corresponding Type I feature is off, exceeding the Type II or III feature limit for that feature shall not cause a license error. This prevents a situation where a user is in License-Error mode (a mode in which the license status is invalid) due to a feature limit being exceeded, and the user cannot get to administrative screens to correct the problem because the feature is turned off and the needed screens are inaccessible. In a try-it-buy-it scenario, the user can try a feature, administer it, decide not to buy it right away, but be able to buy it later and have the administered parameters still be available in translation.

Referring again to FIG. 1, the telecommunication application 124 can include a mode setting agent (not shown) to set the licensing mode of the system 100. As discussed in copending U.S. application Ser. No. 10/232,508, entitled "License Modes in Call Processing", to Rhodes et al., filed concurrently herewith and incorporated herein by this reference, the mode setting agent can set one of three operational modes to the system 100 (namely License-Normal and No-License modes and the License-Error mode).

A remote feature activation system 108 generates the license file that is transmitted to the switching system 100 upon installation or provisioning of the system. Remote feature activation system 108 is discussed in detail in copending U.S. applications Ser. No. 10/232,507, entitled "License File Serial Number Tracking" to Serkowski et al., and Ser. No. 10/232,906, entitled "Remote Feature Activator Feature Extraction" to Walker et al., both filed concurrently herewith, and both of which are incorporated herein by this reference.

The remote feature activation system 108 comprises a remote feature activator 152 and licensing database 156 containing system records corresponding to switch/servers. The remote feature activation system 108 controls license file generation from the system records, license file delivery, and system record creation, and updating. The activator 152 can be embodied in any suitable script. Other operations of the activator 152 are discussed in copending U.S. Application entitled "LICENSE FILE SERIAL NUMBER TRACKING", Ser. No. 10/232,507 to Serkowski et al., filed concurrently herewith. In one configuration, an enterprise resource management system (not shown) maintains a serial number database containing serial number information and other pertinent information and an order database containing order information from which the serial number records are generated.

The data structures in the system record are shown in FIG. 7. Each record comprises the following fields: system ID 700, sold-to customer information 704, distributor information 708, dealer information 712, and customer information 716, authorized user access information 720, license generation information 724 (which comprises platform type 728, serial number 732, product identification or PID 736, application name 740, software version 744, and expiration date 748), Type I feature information 752 (which comprises Type I ON/OFF feature settings—right to use 756 and Type I ON/OFF feature settings—features activated 760), Type II feature information 764 (which comprises Type II value feature right to use 768, Type II value feature range 772 (containing a number or numerical range defined by V1 and V2), and Type II value feature settings 776 (containing the value setting in the range of V1 to V2 (inclusive) for each Type II feature with a right to use)), Type III feature information 780 (which comprises Type III registration feature right to use 784, Type III registration feature release 788 (which has a release value for each Type III feature with a right to use), Type III registration feature range 792 (containing a number or numerical range defined by V1 and V2), and Type III registration feature setting 796 (containing the value setting in the range of V1 to V2 (inclusive)), license delivering information 797, module information 798, application information 799, and system record history 789.

To provide flexibility to customers, customers can alter the settings of Type I, II, and III features within right-of-use limits. This can be done remotely by a customer or user 150 via GUI 106. The user can remotely access the RFA system 108 and turn Type I features (on the right-to-use list) on or off and change the value setting of a Type II or III feature to another value within the permitted range defined by V1 and V2. The list of features to which the customer is entitled can only be changed by placing an order to purchase more features.

Figure 4A:
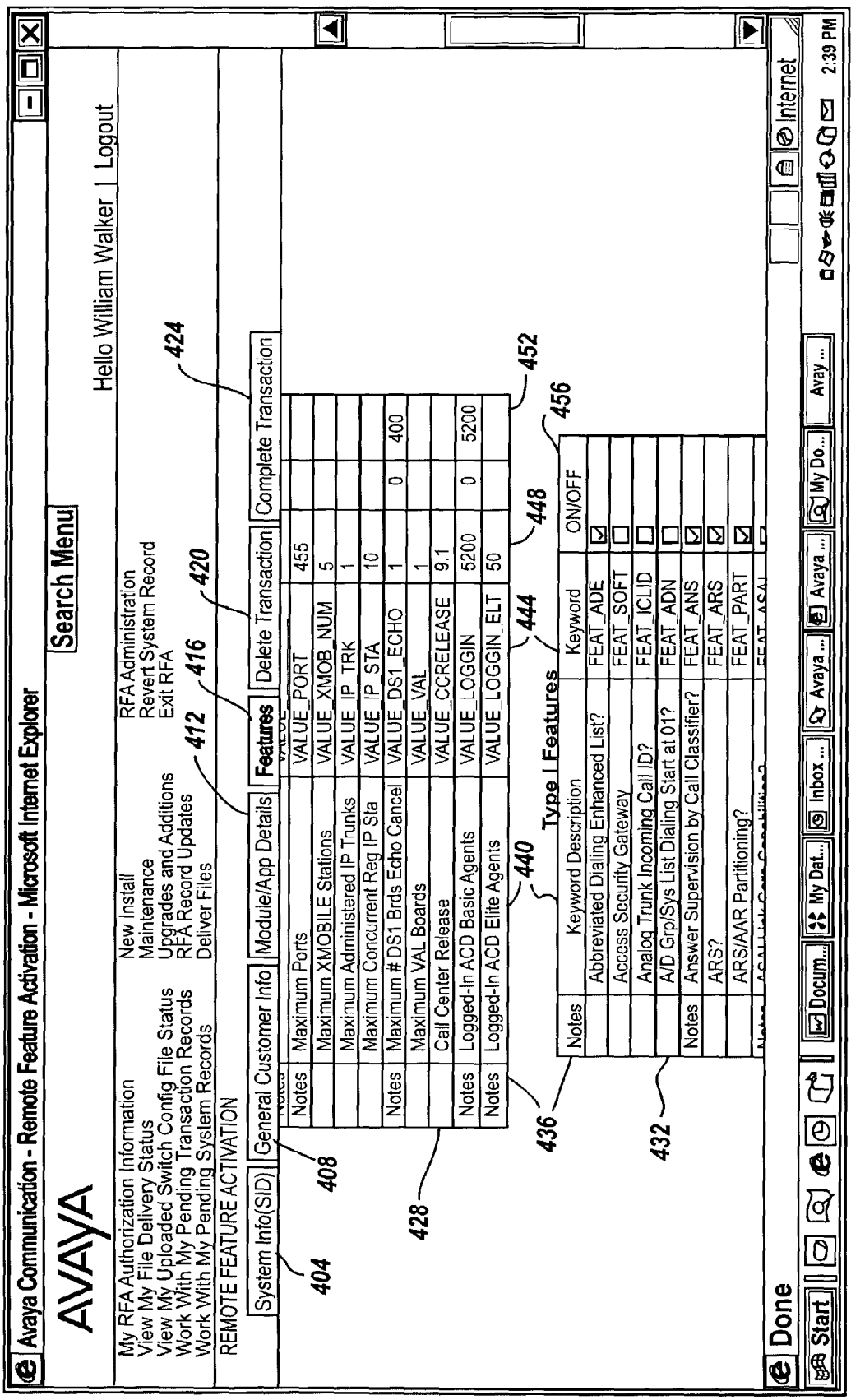
FIG. 4A is a screen of a graphical user interface for altering feature and capacity settings of Type I and Type II features.

FIG. 4A shows a display presented to the customer 150 on GUI 106 to receive changes to feature settings. As can be seen from FIG. 4A, the display 400 has a series of menu selections 404, 408, 412, 416, 420, and 424 horizontally across the top of the display. By clicking on the desired menu selection, the user can cause desired information to be displayed. In the display of FIG. 4A, the user has clicked on the feature menu selection 416. The current value settings for each of the Type II features are presented at the top of the display in Type II feature table 428 while the current on/off mode settings for each of the Type I features are presented at the bottom of the display in Type I feature table 432. Each table has from left to right a column 436 for notes, a column 440 for keyword descriptions, and a column 444 for the keyword corresponding to the keyword description. The Type II feature value settings are presented in column 448 in table 428 and the permissible range for each setting if any is presented in column 452 in table 428. The Type I feature mode settings are presented in column 456 in table 432. The user can alter the values in column 448 and the mode settings in column 456. The user can scroll up and down through the tables as desired.

Figure 4B:
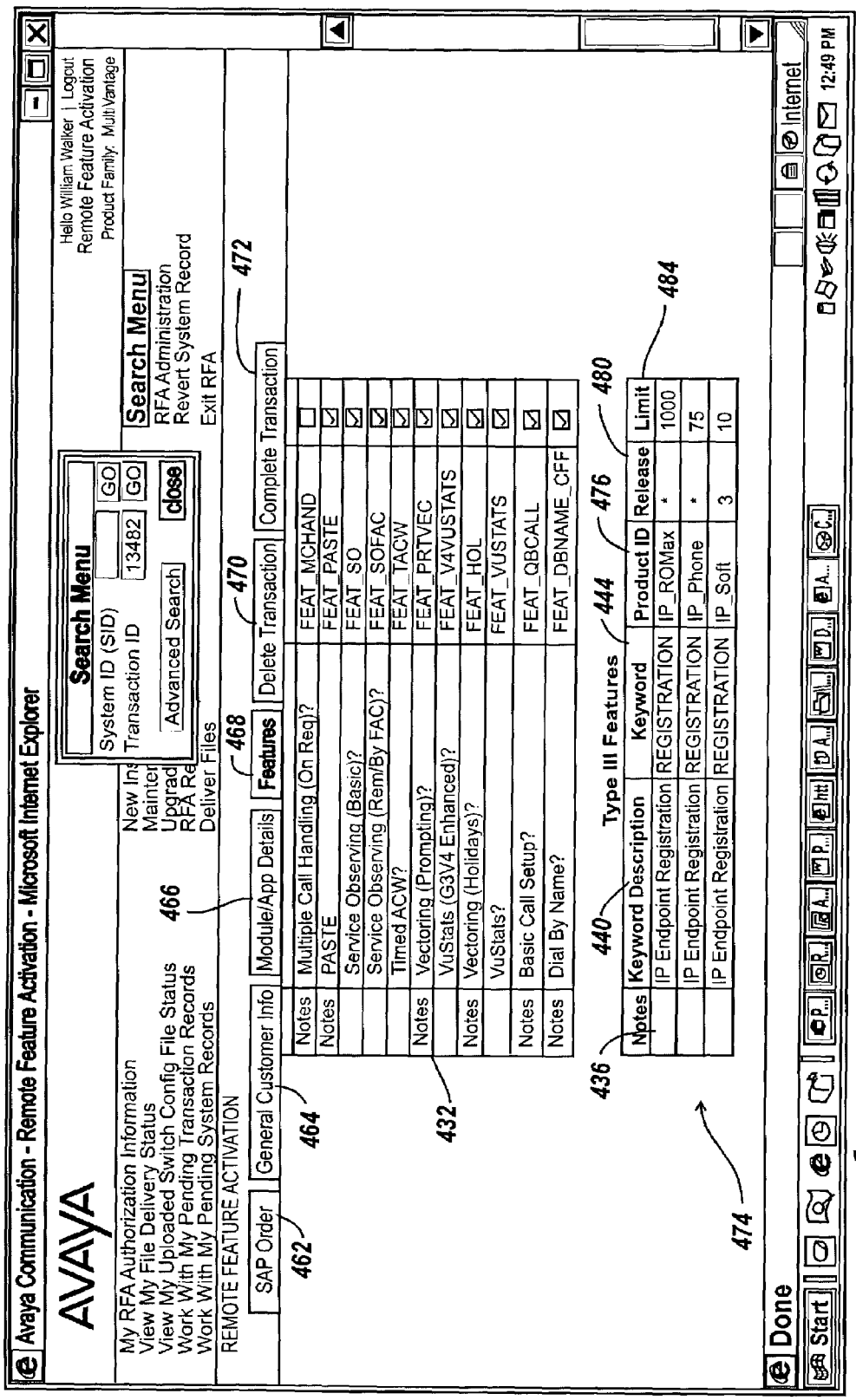
FIG. 4B is a screen of a graphical user interface for altering feature and capacity settings of Type III features.

FIG. 4B shows a display presented to the customer 150 on GUI 106 to receive changes to Type III feature settings. As can be seen from FIG. 4B, the display 460 has a series of menu selections 462, 464, 466, 468, 470, and 472 horizontally across the top of the display. By clicking on the desired menu selection, the user can cause desired information to be displayed. In the display of FIG. 4B, the user has clicked on the feature menu selection 468. The current value settings for each of the Type III features are presented at the bottom of the display in Type III feature table 474. The table 474 has from left to right a column 436 for notes, a column 440 for keyword descriptions, a column 444 for the keyword corresponding to the keyword description, a column 476 for product ID, a column 480 for release number, and a column 484 for feature value settings. The user can scroll up and down through the tables as desired.

Because the list of feature entitlements is tracked separately from the settings for those features, turning a feature off does not cause the feature to be removed from the purchased feature list and therefore the feature is available to be turned back on in the future.

When the user has made all changes, he can click on the menu selection "complete transaction" 424 which will cause the electronic form to be uploaded into the RFA system 108. When a transaction is submitted, a new system record is created by the RFA system 108. However, a license is not generated or delivered to the switch/server 100. License generation and delivery from the updated system record is a separate function from completing a transaction to change feature settings.

Upon receipt of the electronic form, the remote feature activator 152 retrieves the corresponding system record and identifies each of the submitted changes. If acceptable, the activator 152 alters the system record to reflect the requested setting mode changes. The activator 152 confirms that each of the Type I feature setting changes are eligible for change. Certain features cannot be turned off or else the switch/server may be inoperable. For example, the feature keywords corresponding to Wide Area Network or WAN spare processor (WSP), survivable remote processor (SRP), local spare processor (LSP), and duplicated processor cannot be turned off by the customer under any circumstance. The activator 152 also confirms that each of the Type II and III value changes are within the permissible range. When license file delivery is requested by the user, the activator 152 then generates a new license file 144 containing the changes. The license file 144 is uploaded onto communication link 116 and transmitted to the switch/server 100. The license manager 132 replaces the existing license file 144 with the new license file 144.

If any change is not acceptable, the electronic form is returned to the user along with a notification of the error in the form. In that event, the system record is unchanged.

The lock setting of each of the features when a license file 144 is initially forwarded to a customer is typically set to locked. As a result when a customer wants to change a feature, they must get a new license file. In this manner, every time a change is made there is a system record change documented at the RFA system 108 for auditing and technical servicing purposes. The values and settings of the license file 144 at the switch/server will be the same as the recorded values and settings for the license file in database 156 recorded at the RFA system 108.

To provide flexibility to service personnel, service personnel of a selected security level can also alter the contents of the license file 144. For example, the personnel can turn additional features on or off to isolate a problem on the switch. To alter the contents of the license file 144, the personnel access the licensing database 156 via an interface such as the graphic user interface 106, locate the appropriate system record, request a troubleshooting or temporary license, identify the feature changes, and download the license file corresponding to the troubleshooting license to the switch/server.

Figure 5:
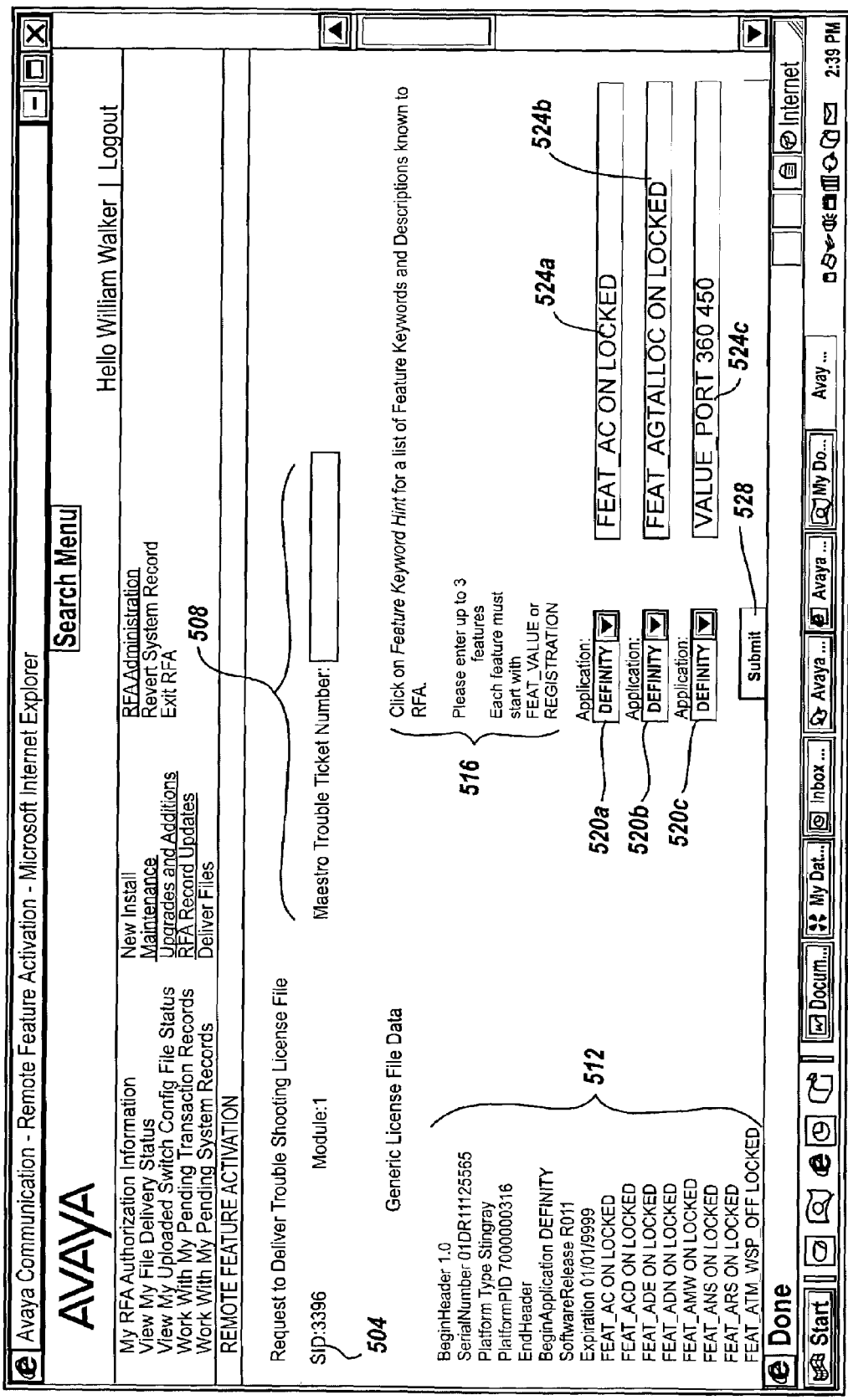
FIG. 5 is a screen of a graphical user interface for generating a troubleshooting license file.

FIG. 5 depicts a screen 500 of GUI 106 used for identifying which additional features are to be activated/deactivated and/or which feature settings are to be altered by user 150 in the troubleshooting license. SID 504 identifies the corresponding system record in the licensing database 156. The trouble ticket or transaction number 508 identifies the service invoice pursuant to which the service personnel are providing service. The generic license file data 512 in the left column presents the contents of the existing license file based on the features and settings in the system record. As can be seen from instruction field 516, up to three features can be added or changed in the troubleshooting license. The instruction field 516 notes that each feature must start with FEAT_, VALUE_, or REGISTRATION. Remote feature activator 152 denies any feature entry that does not begin with these characters.

Fields 524*a-c* correspond to one of the three features to be altered. Each additional feature is added separately by entry of the feature keyword and associated parameters (e.g., on/off and locked/unlocked for Type I features, V1 value and V2 value for Type II features, and product ID, release number, V1 value and V2 value for Type III features) in the fields 524*a-c*. In FIG. 5, field 524*a* contains "FEAT_AC ON LOCKED" or authorization codes feature; field 524*b* "FEAT_AGTALLOC ON LOCKED" or Centre Vu Advocate™ feature; and field 524*c* "VALUE_PORT 360 450" or the V1 and V2 values for the licensed ports. Corresponding application field 520*a-c* specifies the application corresponding to each of the features to be altered.

When the displayed electronic form is completed, the user presses the "submit" icon 528 and the request for a troubleshooting license is transmitted to the RFA system 108 for processing. If the request is acceptable, the remote feature activator 152 generates the troubleshooting license file corresponding to the troubleshooting license, uploads the file onto the communication link 116, and transmits the file to the switch/server 100. As will be appreciated, at least three delivery methods can be used, namely a direct connection as discussed above, a PC download from the website, and e-mail delivery with the license file being an attachment to the e-mail. License manager 132 downloads the file and replaces or overwrites the existing license file 144 with the new license file. Once the troubleshooting license is on the switch/server, the additional features are activated and the service person can perform the necessary diagnostics.

When a feature keyword is entered for the troubleshooting license that is part of the permanent system record, the entered keyword and parameters take precedence and are included in the generic license file forwarded to the switch/server. The parameters from the system record are not included in the file.

The altered features can be returned to their original states or implemented, as the case may be, in a number of ways. For example once troubleshooting is completed, the original license file 144 can be generated, uploaded, and transmitted by the remote feature activator 152 and reinstalled on the switch/server 100. Alternatively, a new permanent license can be installed with the added features necessary to correct the problem. An order is required to add the features to the system record for inclusion in the permanent license file, even when the features are to be given to the customer at no cost. If the troubleshooting license file with the added features is left on the switch/server, those features will remain present on the switch/server until the next installation of a permanent license file. At that time, the troubleshooting license file will be overwritten by the permanent license file. Because the altered features are not included in the corresponding system record, the permanent license file will not include the altered features unless the features are added by an SAP order.

When a troubleshooting license file is generated, remote feature activator 152 causes the event to be logged into a record associated with the switch/server. The entry corresponding to the event includes SID and module for which the troubleshooting license was generated, user name of the individual requesting the troubleshooting license, date and time of the request, ticket number, delivery/method/status, and additional or altered features included in the request.

This permits audit capabilities associated with troubleshooting licenses. The audit can identify all system records for which a troubleshooting license was delivered and all system records for which the last delivered license for any of the modules was a troubleshooting license.

A number of variations and modifications of the invention can be used. It would be possible to provide for some features of the invention without providing others.

For example in one alternative embodiment, the troubleshooting license file is given a shorter expiration date than the permanent license file. This encourages the customer to submit a new order with SAP for a revised permanent license file as soon as possible.

In another alternative embodiment, the troubleshooting license file does not overwrite the original license file. A copy of the original license file is retained by the switch/server and can be restored by an undo command.

In yet another alternative embodiment, the various modules are implemented, in whole or part, as software and/or a logic circuit such as an application specific integrated circuit.

In yet another alternative embodiment, the divisions of the various functions performed by the various modules are different than those set forth above.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A remote feature activation system, comprising:
    a computer; and
    a medium, readable by the computer, the medium being encoded with a data record, the data record being readable by the computer, for licensing a computational component, the computational component having configuration information different from the data record, the data record comprising:
    at least one of a platform type, a serial number associated with the computational component, a platform identifier, an application name, a version, a license expiration date, and a right-to-use indicator;
    at least a first identifier for at least a first operational feature;
    a first mode setting for the at least a first operational feature; and
    a lock setting for the at least a first operational feature, wherein, when the lock setting has a first value, the first mode setting in the data record takes precedence over a second mode setting in the configuration information and, when the lock setting has a second value different from the first value, the second mode setting takes precedence over the first mode setting.

2. The remote feature activation system of claim 1, wherein the first and second mode settings can each have at least two values, one of which enables the corresponding at least a first operational feature and the other of which disables the corresponding at least a first operational feature.

3. The remote feature activation system of claim 1, wherein the computational component is associated with a telecommunications switch and/or server and the configuration file is stored in the switch and/or server.

4. The remote feature activation system of claim 3, wherein the data record is stored at the switch and/or server.

5. The remote feature activation system of claim 1, further comprising a plurality of a platform type, a serial number associated with the computational component, a platform identifier, an application name, a version, a license expiration date, and a right-to-use indicator.

6. The remote feature activation system of claim 1, further comprising first and second value settings for at least a second operational feature.

7. The remote feature activation system of claim 6, wherein the first operational feature is a Type I feature and the second operational feature is a Type II feature.

8. A method for configuring a computational component, comprising:
    providing, configuration information for configuring the computational component and license information for controlling use of the computational component within predetermined parameters, wherein the license information comprises at least a first identifier for at least a first operational feature, a mode setting for the at least a first operational feature, and a lock setting for the at least a first operational feature and
    comparing, by a computer, the configuration information with the license information such that:
    when the lock setting has a first value, the mode setting in the data record for the at least a first operational feature takes precedence over any corresponding mode setting in the configuration information and
    when the lock setting has a second value different from the first value, any respective mode setting in the configuration information for the at least a first operational feature takes precedence over the corresponding mode setting in the data record.

9. The method of claim 8, wherein the mode setting can have at least two values, one of which enables the corresponding at least a first operational feature and the other of which disables the corresponding at least a first operational feature.

10. The method of claim 8, wherein the computational component is associated with a telecommunications switch and/or server and the configuration file is stored in the switch and/or server.

11. The method of claim 10, wherein the data record is stored at the switch and/or server.

12. The method of claim 8, wherein the data record further comprises a plurality of a platform type, a serial number associated with the computational component, a platform identifier, an application name, a version, a license expiration date, and a right-to-use indicator.

13. A method for configuring a computational component, comprising:
    providing configuration information for configuring the computational component and license information for controlling use of the computational component within predetermined parameters, wherein the license information comprises at least a first identifier for at least a first operational feature, a mode setting for the at least a first operational feature, and a lock setting for the at least a first operational feature and
    comparing, by a computer, the configuration information with the license information such that:
    when the lock setting has a first value, the mode setting in the data record for the at least a first operational feature takes precedence over any corresponding mode setting in the configuration information and
    when the lock setting has a second value different from the first value, any respective mode setting in the configuration information for the at least a first operational feature takes precedence over the corresponding mode setting in the data record,
    wherein the data record further comprises at least a second identifier for at least a second operational feature and first and second value settings for the at least a second operational feature and the configuration information comprises a third value setting for the at least a second operational feature and further comprising:
    comparing, by a computer, the configuration information associated with the at least a second operational feature with the license information associated with the at least a second operational feature such that:
    when the third value setting is less than the first value setting, selecting the first value setting as the setting for the at least a second operational feature;
    when the third value setting is more than the second value setting, selecting the first value setting as the setting for the at least a second operational feature; and when the third value setting is between the first and second value settings, selecting the first value setting as the setting for the at least a second operational feature.

14. The method of claim 13, wherein the first operational feature is a Type I feature and the second operational feature is a Type II feature.

15. A remote feature activation system, comprising:
a computer; and
a computer readable medium encoded with a data record for licensing a computational component, the data record being processable by the computer, comprising:
at least a first identifier for at least a first operational feature;
first and second value settings for the at least a first operational feature, wherein the computational component has configuration information different from the data record and further comprising:
at least a second identifier for at least a second operational feature;
a mode setting for the at least a second operational feature; and
a lock setting for the at least a second operational feature, wherein, when the lock setting has a first value, the mode setting in the data record takes precedence over the configuration information and, when the lock setting has a second value different from the first value, the mode setting is a default value.

16. The remote feature activation system of claim 15, further comprising configuration information associated with the computational component, the configuration information comprising a third value setting for the at least a first operational feature and wherein, when the third value setting is less than the first value setting or more than the second value setting, the first value setting is used in lieu of the third value setting and, when the third value setting is more than the first value setting and less than the second value setting, the third value setting is used in lieu of the first and second value settings.

17. The remote feature activation system of claim 16, wherein the computational component is associated with a telecommunications switch and/or server and the configuration file is stored in the switch and/or server.

18. The remote feature activation system of claim 17, wherein the data record is stored at the switch and/or server.

19. The remote feature activation system of claim 16, wherein the first operational feature is a Type II feature and the second operational feature is a Type I feature.

20. The remote feature activation system of claim 15, wherein the mode setting can have at least two values, one of which enables the corresponding at least a second operational feature and the other of which disables the corresponding at least a second operational feature.

21. The remote feature activation system of claim 15, further comprising a plurality of a platform type, a serial number associated with the computational component, a platform identifier, an application name, a version, a license expiration date, and a right-to-use indicator.

22. A method for configuring a computational component, comprising:
providing configuration information for configuring the computational component and license information for controlling use of the computational component within predetermined parameters, wherein the data record comprises at least a first identifier for at least a first operational feature and first and second value settings for the at least a first operational feature and the configuration information comprises a third value setting for the at least a first operational feature and further comprising:
comparing, by a computer, the configuration information associated with the at least a first operational feature with the license information associated with the at least a first operational feature such that:
when the third value setting is less than the first value setting, selecting the first value setting as the setting for the at least a first operational feature;
when the third value setting is more than the second value setting, selecting the first value setting as the setting for the at least a first operational feature; and
when the third value setting is between the first and second value settings, selecting the first value setting as the setting for the at least a first operational feature.

23. The method of claim 22, wherein the license information further comprises at least a second identifier for at least a second operational feature, a mode setting for the at least a second operational feature, and a lock setting for the at least a second operational feature and
comparing the configuration information with the license information such that:
when the lock setting has a first value, the mode setting in the data record for the at least a second operational feature takes precedence over any corresponding mode setting in the configuration information and
when the lock setting has a second value different from the first value, any respective mode setting in the configuration information for the at least a second operational feature takes precedence over the corresponding mode setting in the data record.

24. The method of claim 23, wherein the mode setting can have at least two values, one of which enables the corresponding at least a second operational feature and the other of which disables the corresponding at least a second operational feature.

25. The method of claim 22, wherein the computational component is associated with a telecommunications switch and/or server and the configuration file is stored in the switch and/or server.

26. The method of claim 25, wherein the data record is stored at the switch and/or server.

27. The method of claim 22, wherein the data record further comprises a plurality of a platform type, a serial number associated with the computational component, a platform identifier, an application name, a version, a license expiration date, and a right-to-use indicator.

28. The method of claim 22, wherein the first operational feature is a Type II feature and the second operational feature is a Type I feature.

29. The method of claim 22, wherein in the comparing step further comprises the substep of:
when the first and second value settings are equal, selecting the first value setting as the setting for the at least a first operational feature.

30. A remote feature activation system, comprising:
a computer; and
a computer readable medium encoded with a data record for licensing a computational component, the data record being processable by the computer and comprising:
at least one of a platform type, a serial number associated with the computational component, a platform identifier, an application name, a version, a license expiration date, and a right-to-use indicator;

a right to use indicator associated with the at least a first operational feature, the right to use defining a right to use the at least a first operational feature;

a mode and value setting for the at least a first operational feature, the mode setting at least one of sets and configures the at least a first operational feature and the value setting defines a quantity associated with the at least a first operational feature; and a lock setting for the at least a first operational feature, wherein, when the lock setting has a first value, a first mode setting in the data record takes precedence over a second different mode setting in the configuration information and, when the lock setting has a second value different from the first value, the second mode setting takes precedence over the first mode setting.

31. The remote feature activation system of claim 30, wherein the mode setting can have at least two values, one of which enables the corresponding at least a first operational feature and the other of which disables the corresponding at least a first operational feature.

32. The remote feature activation system of claim 30, wherein the computational component is associated with a telecommunications switch and/or server.

33. The remote feature activation system of claim 30, further comprising a plurality of a platform type, a serial number associated with the computational component, a platform identifier, an application name, a version, a license expiration date, and a right-to-use indicator.

34. The remote feature activation system of claim 30, comprising first and second value settings for the at least a first operational feature.

35. The remote feature activation system of claim 34, wherein the at least a first operational feature is one of a Type I, II, and III feature.

36. The remote feature activation system of claim 30, wherein the right to use indicator comprises a set of feature keywords corresponding to the at least a first operational feature.

37. A remote feature activation system, comprising:
a computer; and
a memory comprising a data record for licensing a computational component, the computational component having configuration information different from the data record and the data record being readable by the computer, the data record comprising:
a plurality of a platform type, a serial number associated with the computational component, a platform identifier, an application name, a version, a license expiration date, and a right-to-use indicator;
at least a first identifier for at least a first user selectable operational feature;
a first mode setting for the at least a first operational feature; and
a lock setting for the at least a first operational feature, wherein, when the lock setting has a first value, the first mode setting in the data record takes precedence over a second mode setting in the configuration information and, when the lock setting has a second value different from the first value, the second mode setting takes precedence over the first mode setting.

38. A method, comprising:
maintaining, by a computer of a manufacturer, a remote feature activation application and a licensing database, the database comprising, for each customer and product pairing, a plurality of features of the corresponding product, which features may be used by the product, and a set of indicators indicating whether or not each corresponding feature is activated or deactivated on the product;

after a license has been generated and delivered to a first customer for a first product of the manufacturer, the first product having been purchased by the first customer, providing, by the manufacturer's computer and to the first customer, a first plurality of features, which first plurality of features may be used by the first product and the respective indicator values for each feature;

thereafter receiving, from the first customer and while the license is valid, a request to at least one of activate and deactivate one or more of the first plurality of features in the first product;

in response, at least one of activating and deactivating, by the manufacturer's computer, the one or more of the first plurality of features in the first product; and generating and delivering, by the manufacturer's computer, to the first customer a new license for the first product, the new license reflecting the at least one of activated and deactivated one or more features.

39. The method of claim 38, wherein the first plurality of features is separately tracked from a setting for each of the first plurality of features, whereby deactivating a feature does not cause the deactivated feature to be removed from the first plurality of features.

40. The method of claim 38, wherein the at least one of activating and deactivating step comprises:
comparing the request received from the first customer with a system record containing the first plurality of features;
when the changes in the request are not proper, ignoring the request and not performing the at least one of activating and deactivating and generating and delivering steps; and
when the changes in the request are proper, performing the at least one of activating and deactivating and generating and delivering steps.

41. The method of claim 38, wherein the first plurality of features comprises first and second features for which the first customer has paid and a third feature for which the customer has not paid, wherein the third feature may be used by the first product only for a trial period, and further comprising:
receiving, from the first customer, a request to activate the third feature in the first product;
in response, activating the third feature in the first product; and
generating and delivering to the first customer a temporary license, the new license reflecting the first, second, and third features and having a license expiration date at the conclusion of the trial period.

42. The method of claim 41, further comprising:
after the trial period, causing the temporary license to expire; and
generating and delivering a permanent license file for the first product containing the first and second features but not the third feature.

43. The method of claim 41, wherein data structures defining the temporary license are stored separately from system record data structures describing the first and second features but not the third feature.

44. The method of claim 38, wherein the licensing database comprises, for each customer and product pairing:
at least one of a platform type, a serial number associated with the product, a platform identifier, an application name, a version, a license expiration date, and a right-to-use indicator;

a right to use indicator associated with the at least a first feature, the right to use defining a right to use the at least a first feature;

a mode and value setting for the at least a first feature, the mode setting at least one of sets and configures the at least a first feature and the value setting defines a quantity associated with the at least a first feature; and a lock setting for the at least a first feature, wherein, when the lock setting has a first value, a first mode setting in the data record takes precedence over a second different mode setting in the configuration information and, when the lock setting has a second value different from the first value, the second mode setting takes precedence over the first mode setting.

* * * * *